(12) United States Patent
Hosie et al.

(10) Patent No.: US 6,330,918 B1
(45) Date of Patent: Dec. 18, 2001

(54) AUTOMATED DOG-TYPE RISER MAKE-UP DEVICE AND METHOD OF USE

(75) Inventors: Stanley Hosie; George Chalmers, both of Peterhead; Robert Buchan, Aberdeen, all of (GB)

(73) Assignee: ABB Vetco Gray, Inc., Houston, TX (US)

( * ) Notice: Subject to any disclaimer, the term of this patent is extended or adjusted under 35 U.S.C. 154(b) by 0 days.

(21) Appl. No.: 09/514,615

(22) Filed: Feb. 28, 2000

Related U.S. Application Data

(60) Provisional application No. 60/121,983, filed on Feb. 27, 1999.

(51) Int. Cl.[7] .................................................. G21B 7/132
(52) U.S. Cl. ........................ 166/341; 166/367; 166/345; 166/350; 166/378
(58) Field of Search .................................. 166/367, 338, 166/341, 344, 345, 350, 244.1, 378, 381

(56) References Cited

U.S. PATENT DOCUMENTS

| | | |
|---|---|---|
| 3,179,176 | 4/1965 | Goepfert . |
| 3,847,215 * | 11/1974 | Herd . |
| 4,030,309 | 6/1977 | Mason . |
| 4,511,287 * | 4/1985 | Horton . |
| 4,712,620 * | 12/1987 | Lim et al. . |
| 5,330,294 * | 7/1994 | Guesnon . |
| 5,427,180 * | 6/1995 | Leite et al. . |
| 6,004,074 * | 12/1999 | Shanks . |

* cited by examiner

Primary Examiner—Roger Schoeppel
(74) Attorney, Agent, or Firm—Bracewell & Patterson, L.L.P.

(57) ABSTRACT

A device automatically makes up a riser string from riser spools, each having an ancillary line and dog-type connectors. A support member supports a second riser spool for connection. A torque arm above the support member hinges open to accept a first riser spool and hinges close to engage the first spool and rotate the first spool to align its ancillary line with the ancillary line of the second spool. A guide arm above the support member hinges open to accept the first spool and hinges closed to engage and radially position the first spool while allowing vertical movement of the first spool. Connector actuators are positioned around the support member to actuate the connectors when the first spool is lowered onto the second spool.

23 Claims, 5 Drawing Sheets

AUTOMATED DOG-TYPE RISER MAKE-UP DEVICE AND METHOD OF USE

CROSS-REFERENCE TO RELATED APPLICATIONS

This invention claims the benefits of provisional application Ser. No. 60/121,983, filed Feb. 27, 1999, in the United States Patent & Trademark Office.

TECHNICAL FIELD OF THE INVENTION

This invention relates in general to a subsea riser system, and more particularly to an automated device for aligning two riser spools having attached ancillary lines and actuating a connector to connect the spools.

BACKGROUND OF THE INVENTION

In a subsea well, an elongate tubular riser connects a subsea wellhead to a platform or vessel at the surface. The riser may have a series of ancillary lines, such as a choke and a kill line, which run along the length of the riser. The riser and ancillary lines are coated in buoyant foam, yielding a smooth outer surface. The riser comprises a series of riser spools of finite length which must be connected to reach from the platform or vessel to the well at the sea floor. Each riser is joined to the next by a riser connector, and with each connection, the riser spools must be aligned both angularly to align the ancillary lines and radially. Additionally, the device actuating the connector must be aligned with the connector itself.

Because a typical riser consists of many riser spools, the alignment and connection process is repeated many times, once for each connection. This process, when performed manually is time consuming and requires significant man power, but could be automated to save time.

Therefore, there is a need for a device to automate the riser make up process. The device should align the risers and actuate the connector with a minimum of time spent making each connection. Additionally, the device should minimize the number of workers required for each make up.

SUMMARY OF THE INVENTION

The present invention is drawn to a device for aligning a first and a second riser spools and actuating a riser connector on the first spool to connect with the second spool. Each spool has an ancillary line which runs adjacent to a main line. The device has a base assembly having a portal with a central axis and a plurality of support members. The support members are adapted to engage and support the second spool along the central axis and in portal. A torque arm is spaced from the base assembly and aligns with the central axis. The torque arm is adapted to rotate the first spool about the central axis to align the ancillary line of the first spool with the ancillary line of the second spool. A guide arm is spaced from the base assembly and aligns with the central axis. The guide arm is adapted to radially align the first spool over the second spool and allow vertical movement of the first spool. A connector actuator is adjacent the base assembly and adapted to actuate the connector when the first spool is lowered onto the second spool.

The guide arm is a jaw openable and closeable to release and accept a riser spool. The torque arm is a jaw openable and closeable to release and accept a riser spool. The connector is a plurality of dog locks radially spaced about a circumference of the connector and the connector actuator is a plurality of rotary actuators adapted to actuate the dog locks. The rotary actuators are mounted to a rotary table. The rotary table is actuable to rotate about the central axis to align the rotary actuators with the dog locks of the connector. The rotary actuators are mounted to extend toward and away from the central axis to engage and disengage from the dog locks.

The first and second spools each have a collar with an alignment notch. The notches are such that when aligned, the ancillary line of the first spool is aligned with the ancillary line of the second spool. The base assembly has a key adapted to engage the notches and ensure alignment of the ancillary lines. The base assembly is split and adapted to slide apart to facilitate placement of the second spool. The support members are beams arrayed about the portal and inwardly extendable to engage and support the second spool in the portal.

DETAILED DESCRIPTION OF THE PREFERRED EMBODIMENT

Figure 1:
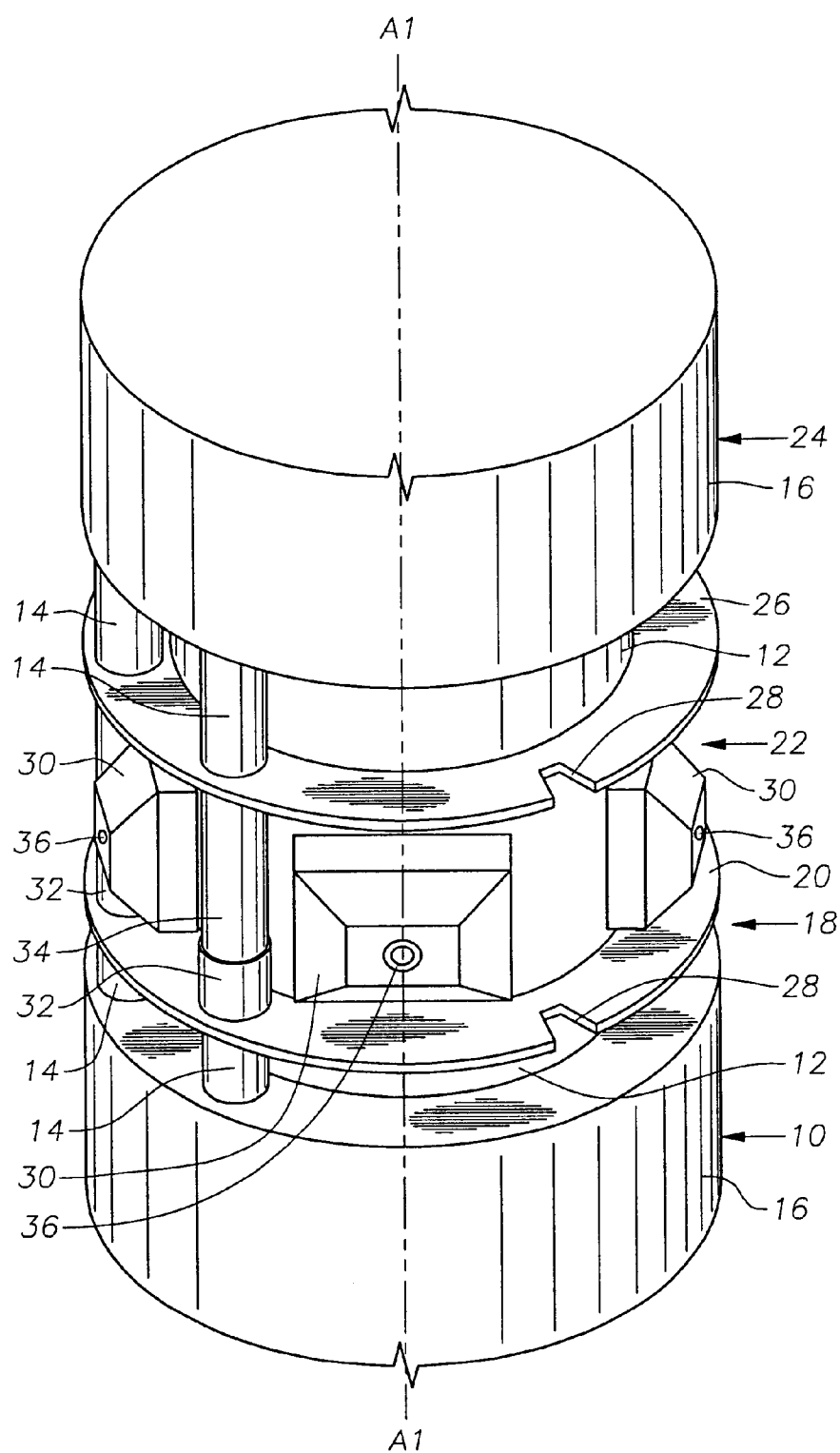
FIG. 1 is a perspective view of the juncture of two dog-type risers for use with an automated dog-type riser make-up device constructed in accordance with this invention.

Referring first to FIG. 1, a riser spool 10 for use with the invention is generally comprised of a tubular main line 12 surrounded by smaller, tubular ancillary lines 14. The main line 12 and ancillary lines 14 are encased in buoyant foam 16, which is formed with a substantially smooth, continuous outer surface. At one end, main line 12 has a male end 18. A discus support collar 20 having an alignment notch 28 extends outward from male end 18. At the other end, main line 12 has a female end 22 which can sealingly accept male end 18 of a second riser spool 24. A discus alignment collar 26 having an alignment notch 28 extends outward from female end 22. A plurality of dog locks 30 are equally spaced along the outer diameter of main line 12, beneath alignment collar 26.

Ancillary lines 14 similarly have an ancillary male ends 32 and an ancillary female ends 34. Ancillary female end 34 of a first riser spool 10 is adapted to sealingly accept the ancillary male end 32 of a second spool 24 when the main lines 12 of spools 10 and 24 are sealed.

FIG. 1 depicts the junction of a first riser spool 10 and a second riser spool 24, wherein the male end 18 and ancillary male end 32 of second riser spool 24 are sealingly accepted into female end 22 and ancillary female end 34 respectively of spool 10. Riser spools 10, 24 can be locked in such a joined configuration with dog locks 30. Each dog lock 30 has an actuating screw 36 which when rotated clockwise forces a dog (not shown) from a position along the inner diameter of main line 12, radially inward. The dogs have a profile adapted to engage a corresponding profile on male end 18 of a second riser spool 24. In the locked position, riser spools 10, 24 resist separation and effectively operate as a single unit with which other spools can be joined. The juncture can be released and the two spools 10, 24 separated by rotating actuating screws 36 counterclockwise until dogs release the corresponding profile on male end 18. The torque required to rotate actuating screws 36 is of whether the dogs are engaged or released in that actuating screws 36 will resist turning clockwise when dogs are engaged with the corresponding profile and resist turning counter clockwise when the dogs are fully retracted.

Figure 2:
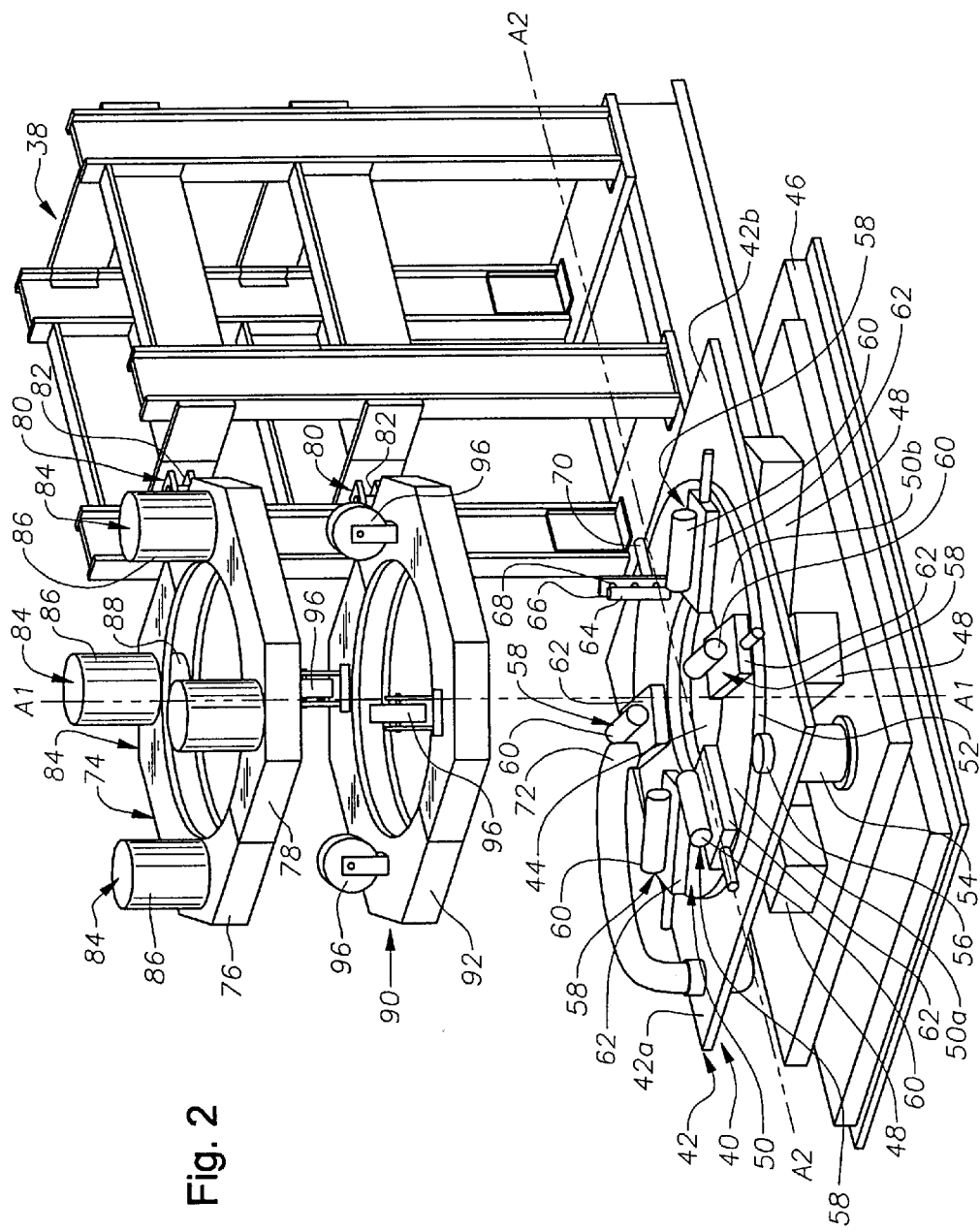
FIG. 2 is a perspective view of an automated dog-type riser make-up device constructed in accordance with this invention.

Referring to FIG. 2, an automated riser make-up device constructed in accordance with this invention generally comprises a guide tower 38 joined to and extending up from a spider assembly 40. Spider assembly 40 is generally centered about riser axis A1, having a planar deck 42 extending orthogonally from axis A1 and split in halves, first half 42a and second half 42b. A circular riser portal 44 having a diameter greater than the larger of alignment collar 26 or support collar 20, evenly straddles each deck half 42a, 42b. Deck halves 42a, 42b are slidingly mounted to a deck base 46, and are adapted to slide along slide axis A2 from a closed position, wherein the deck halves 42a, 42b abut one another and riser portal 44 is centered about riser axis A1, to an open position outward from axis A1. Although the diameter of riser portal 44 is large enough to pass a riser spool 10, 24, deck 42 in the open position to allows increased clearance to pass riser spool 10, 24. Deck halves 42a, 42b are opened and closed using a hydraulic or mechanical means known in the art.

Figure 3:
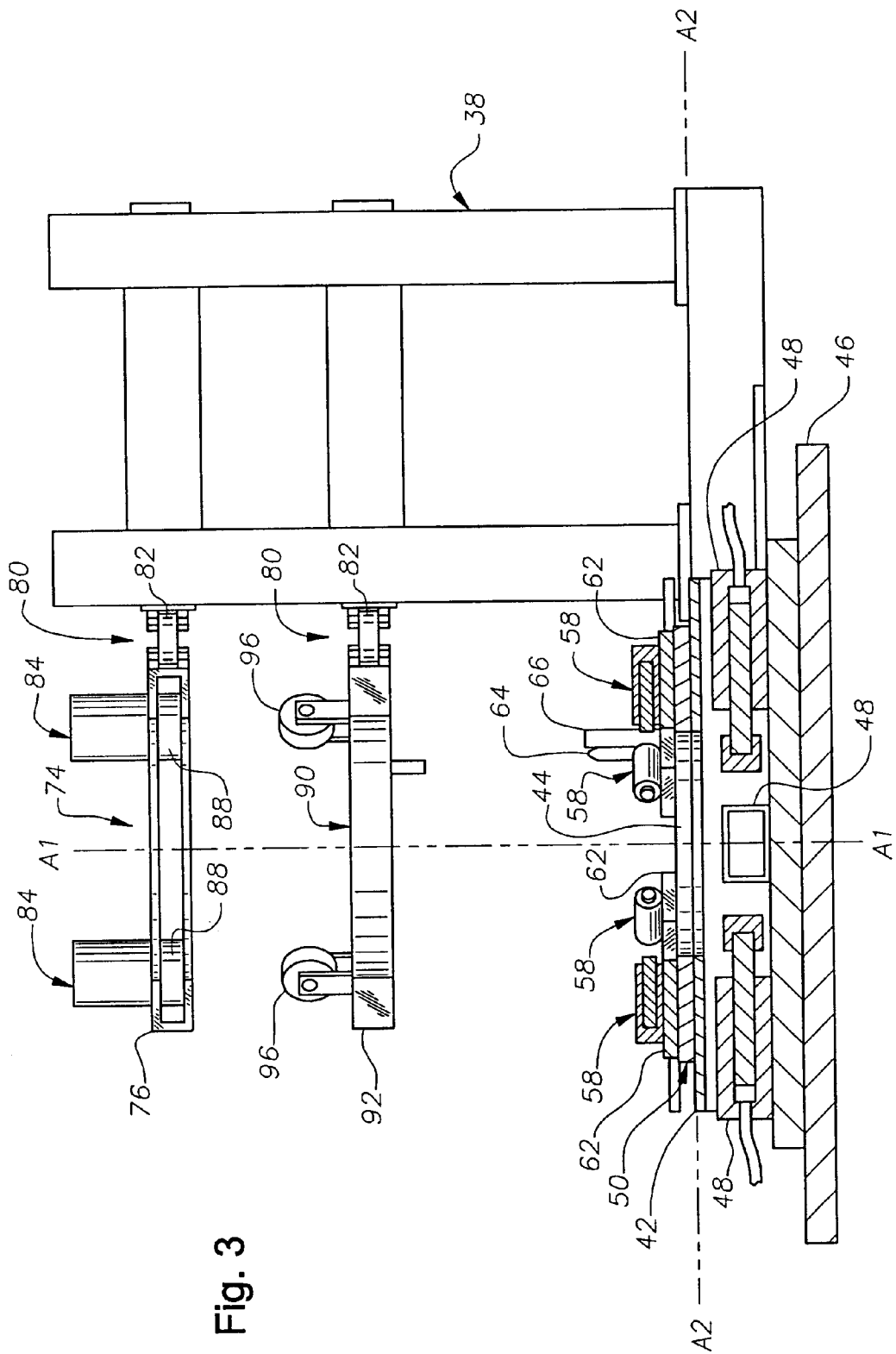
FIG. 3 is a side sectional view of an automated dog-type riser make-up device constructed in accordance with this invention.

As shown in FIG. 3, a plurality of spider rams 48 are beneath deck 42 and oriented radially from the circumference of riser portal 44. Each spider ram 48 is a beam which can be hydraulically or mechanically extended from a retracted position to an extended position; the extended position being inward toward axis A1. Spider rams 48 are joined to deck 42 and slide with deck 42 to its open and closed positions. When deck 42 is closed, riser spool can be accepted through riser portal 44 and vertically supported by its support collar 20 on extended spider rams 48. Spider rams 48 can be retracted to allow riser spool 24 to pass freely through riser portal 44.

Referring again to FIG. 2, a split rotary table 50 is mounted to deck 42 with a first half 50a rotably secured to first deck half 42a and a second half 50b rotably secured to second deck half 42b. Rotary table 50 is shaped generally in a ring having an inner diameter concentric with, and approximately equal to, the diameter of riser portal 44. When deck 42 is opened, rotary table 50 splits and table half 50a moves with deck half 42a and table half 50b moves with deck half 42b. A plurality of gear teeth 52 are spaced along the outer circumference of rotary table 50. Rotary orientation motor 54 is mounted beneath deck 42 and turns a pinion 56 about an axis parallel to axis A1. Pinion 56 is mounted above deck 42 and engages gear teeth 52. As motor 54 turns pinion 56, pinion 56 engages gear teeth 52 and rotates rotary table 50 about axis A1. Sensors indicate the position of rotary table 50.

A plurality of dog actuators 58 are arrayed on rotary table 50 oriented radially from its inner diameter. The number and spacing of dog actuators 58 corresponds to the number and spacing of dog locks 30 on riser spool 10, 24. Each dog actuator 58 is comprised of a rotary drive motor 60 with a torque limiting transducer mounted to a slide base 62. Rotary drive motor 60 is adapted to engage and rotate corresponding actuating screw 36. Slide base 62 can be hydraulically or mechanically actuated to position drive motor 60 inward towards axis A1 to allow drive motor 60 to engage actuating screw 36 and outward to allow passage of riser spool 10, 24 through riser portal 44. Slide base 62 is located by a mechanical or electrical limit switch known in the art configured to stop the movement of slide base 62 at a predetermined point relative to axis A1.

A male key 64 resides between a pair of dog actuators 58 on rotary table 50. Male key 64 is formed by a generally rectangular block sized to fit in notch 28, and oriented with its long axis vertically. Key 64 is mounted to a vertical base plate 66 in a manner allowing it to slide freely in a radial plane of axis A1. Base plate 66 is secured to and extends vertically up from rotary table half 50b between a pair of dog actuators 58. Male key 64 is biased radially inward by springs 68 mounted between base plate 66 and male key 64. A pneumatic cylinder 70 is joined to male key 64 and base plate 66 such that when actuated, it overcomes springs 68 and retains male key 64 radially outward. With key 64 in this outward position, female end 22 of riser spool 10 can be lowered proximate to deck 42 and centered about axis A1 without interference from key 64. Pneumatic cylinder 70 can then be released allowing springs 68 to force key 64 inward into contact with the circumferential surface of alignment collar 26. As riser spool 10 is rotated, notch 28 will become aligned with key 64 and springs 68 will force key 64 into notch 28, thus preventing further rotation. Notch 28 is positioned on support collar 20 and alignment collar 26 such that when aligned with key 64, dog locks 30 are aligned with dog actuators 58 and ancillary lines 14 of spool 10 are aligned with ancillary lines 14 of spool 24. A vertical position sensor (not shown) is mounted in male key 64 to sense the vertical position of spool 10.

At least one power gooseneck 72 is rotably mounted to deck 42. Gooseneck 72 is a pipe supplying water or other fluid which is adapted to be automatically positioned over riser portal 44 to provide flow at various points in the portal 44, and thus fill ancillary lines 14 of spool 24. Further, gooseneck 72 can be automatically rotated clear of riser portal 44 so as not to interfere with rotary table 50 and allow free passage of riser spool 10, 24 through portal 44. Gooseneck 72 is positioned by hydraulic or mechanical means known in the art.

Figure 4:
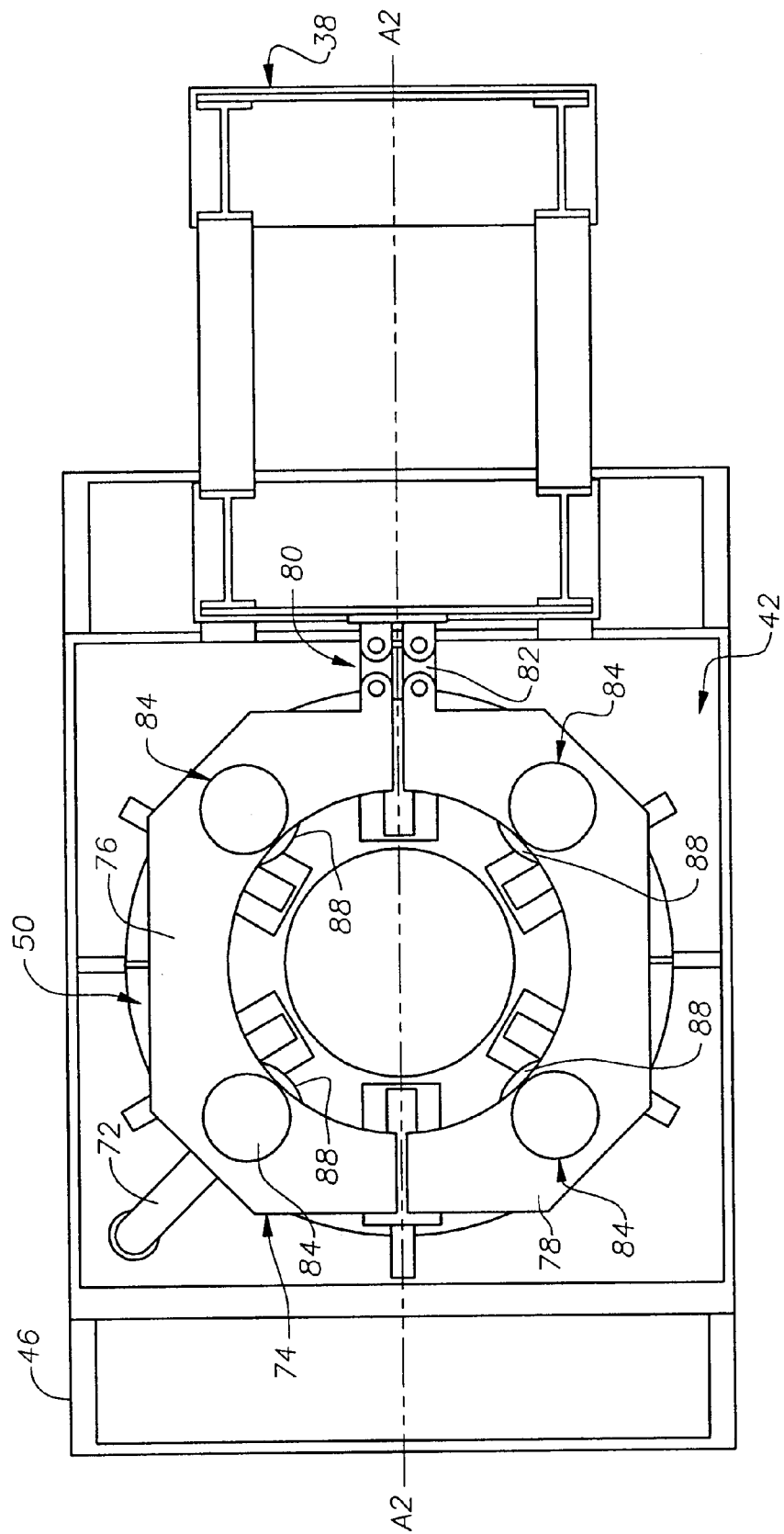
FIG. 4 is a top view of an automated dog-type riser make-up device constructed in accordance with this invention.
Figure 5:
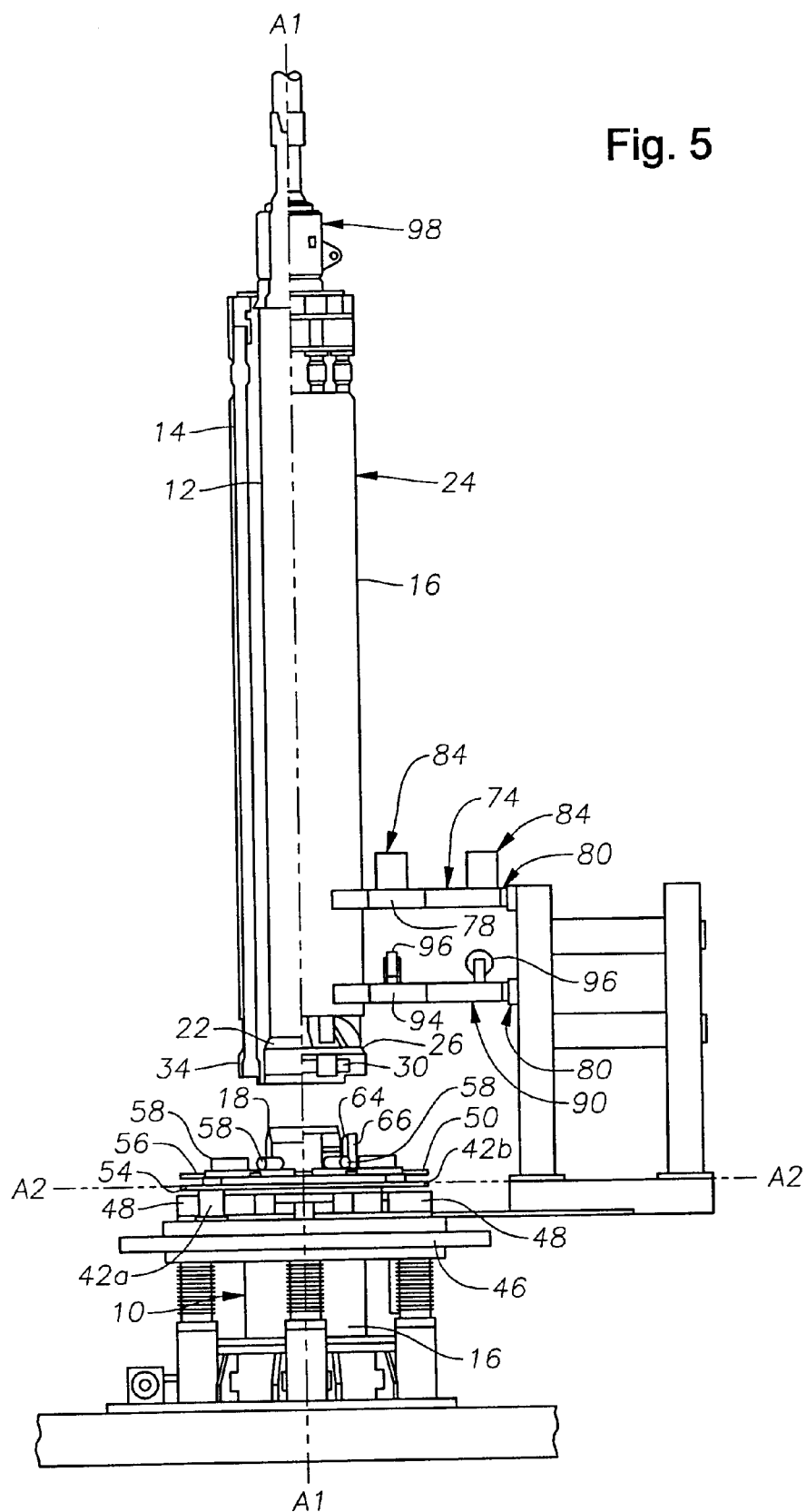
FIG. 5 is a side view of a riser being landed into an automated dog-type riser make-up device constructed in accordance with this invention.

Guide tower 38 is a relatively rigid structure which extends outward and upward from one side of spider assembly 40. It has a hinged torque arm 74 which extends from its upper end outward over riser portal 44. Torque arm 74 is generally comprised of two halves, a first half 76 and a second half 78, hingedly joined to guide tower 38 by an articulated hinge 80. As seen in FIG. 4, articulated hinge 80 is comprised of an intermediate link 82 having one end hingedly joined to guide tower 38 and the other, hingedly joined to a half 76 or 78 of torque arm 74. Articulated hinge 80 allows each half 76, 78 of torque arm 74 to hinge from a closed position, in which the halves 76, 78 generally form a ring concentric about axis A1, to an open position apart from one another and away from axis A1, thus allowing ample room to position riser spool 10 over riser portal 44. Articulated hinge 80 hinges at two points which enables torque arm halves 76, 78 to open wider and provide more room than if singly hinged. The opening and closing of torque arm halves 76, 78 is actuated by hydraulics or electric means known in the art, incorporating position sensors which detect the position of the halves 76, 78.

A plurality of horizontal rotating actuators 84 are arrayed equally about each half 76, 78 of torque arm 74. Each horizontal rotating actuator 84 includes a roller motor 86 which rotably drives a horizontal roller 88 about an axis parallel to axis A1. A portion of each horizontal roller 88 extends radially inward from torque arm 74 such that torque arm 74 can be closed around riser spool 10 and rollers 88 frictionally contact buoyant foam 16.

A hinged guide arm 90 extends from guide tower 38 beneath torque arm 74. Guide arm 90 generally has two halves, a first half 92 and a second half 94. Each half 92, 94 is joined to guide tower 38 by an articulated hinge 80 similar to the hinge joining torque arm 74 and guide tower 38. As with torque arm 74, articulated hinge 80 allows each guide arm half 92, 94 to hinge from a closed position, in which the halves 92, 94 generally form a ring concentric about axis A1, to an open position apart from one another and away from axis A1, thus allowing ample room to position riser spool 10 over riser portal 44. The opening and closing of guide arm halves 92, 94 is actuated by hydraulics or electric means known in the art, incorporating position sensors which detect the position of the halves 92, 94.

A plurality of vertical rollers 96, having an axis of rotation perpendicular to axis A1, are arrayed equally about each half of guide arm 90. Unlike horizontal rollers 88, vertical rollers 96 are not motorized and rotate freely. A portion of each roller 96 extends inward from guide arm 90 such that when guide arm 90 is closed around riser spool 10, rollers 96 frictionally contact buoyant foam 16.

Referring to FIG. 3, the invention can be used to make-up two riser spools 10, 24. Each make-up begins with torque arm 74 and guide arm 90 opened and deck 42 closed and centered around axis A1. Male end 18 of spool 24 extends upward through riser portal 44, and support collar 20 of spool 24 rests on extended spider rams 48. Pneumatic cylinder 70 is released and springs 68 bias male key 64 inward towards axis A1 until male key 64 forcibly contacts support collar 20 (FIG. 1). Rotary table 50 is rotated about axis A1 by orientation motor 54 driving pinion 56 until male key 64 falls into notch 28 of support collar 20. Motor 54 is then disabled and pneumatic cylinder 70 is actuated to retract male key 64. Gooseneck 72 (FIG. 2) is automatically rotated to a position allowing it to fill ancillary lines 14 of spool 24. When ancillary lines 14 of spool 24 have been filled, gooseneck 72 is then rotated away from axis A1 so as not to interfere with rotary table 50.

A handling tool 98 is used to grasp and lower spool 10 over spool 24 such that alignment collar 26 is adjacent to male key 64 and female end 22 of spool 10 is in close proximity to male end of spool 24. Torque arm 74 is then closed around spool 10 and horizontal rollers 88 fictionally contact buoyant foam 16. In some cases spool 10 will not require buoyancy and thus have no buoyant foam 16. If this is the case, a tubular housing (not shown) can be fitted around the ancillary lines 14 to provide rollers 88, 96 a continuous surface to contact. Position sensors ensure that torque arm 74 is completely closed. Pneumatic cylinder 70 is released and springs 68 bias male key 64 inward towards axis A1 until male key 64 forcibly contacts alignment collar 26 (FIG. 1). Horizontal rotation actuators 84 in torque arm 74 are actuated and spool 10 is rotated until notch 28 in alignment collar 26 is aligned with male key 64, thus allowing male key 64 to extend into notch 28 and prevent further rotation. With male key 64 engaged in notch 28 ancillary lines 14 of spool 10 are aligned with ancillary lines 14 of spool 24 and actuating screws 36 of dog locks 30 are aligned with dog actuators 58. Guide arm 90 is then closed around spool 10 and vertical rollers 96 contact buoyant foam 16. Position sensors ensure that guide arm 90 is completely closed, and torque arm 74 is actuated back to its original position away from spool 10. Spool 10 is lowered onto spool 24 and vertical rollers 96 prevent spool 10 from rotating while keeping spool 10 centered over spool 24. Male end 18 and ancillary male end 32 of spool 24 are concentrically accepted into female end 22 and ancillary female end 34 respectively of spool 10. The sensor in male key 64 verifies spool 10 is at the correct elevation.

Slide bases 62 are actuated to position dog actuators 58 inward toward axis A1 and engage rotary drive motor 60 of each dog actuator 58 with actuating screws 36 of each dog lock 30. Rotary drive motors 60 are activated to turn actuating screws 36 and engage dog locks 30, thus locking spool 10 to spool 24. Torque transducers in drive motors 60 sense when dog locks 30 are fully engaged and deactivate drive motors 60. Slide bases 62 are actuated to return dog actuators 58 to their original position. Guide arm 90 is opened and retracted to its original position. Deck halves 42a, 42b are opened. Spider rams 48 are retracted away from axis A1 and spool 10 is lowered such that its male end 18 is proximate to deck 42. Pneumatic cylinder 70 is actuated to retract male key 64. Deck halves 42a and 42b are closed and spider rams 48 are extended inwards. Spool 10 is then lowered to allow its support collar 20 to rest on rams 48. Handling tool 98 is released to retrieve the next spool.

The invention can be used to break the junction of two riser spools 10, 24. First, handling tool 98 grasps male end 18 of spool 10 and deck halves 42a, 42b are opened. Spool 10 is lifted until alignment collar 26 of spool 10 is in proximity to male key 64. Deck halves 42a, 42b are closed and spider rams 48 are extended. Support collar 20 of spool 24 is then allowed to rest on rams 48. Pneumatic cylinder 70 is released and springs 68 bias male key 64 inward towards axis A1 until male key 64 forcibly contacts support collar 20 and alignment collar 26. The sensor in male key 64 verifies spool 10 is at the correct elevation. Rotary table 50 is rotated about axis A1 by orientation motor 54 driving pinion 56 until male key 64 falls into notch 28. Motor 54 is then disabled. Slide base 62 of each dog actuator 58 is actuated to move dog actuators 58 inward toward axis A1 until the rotary drive motor 60 of each dog actuator 58 engages corresponding dog actuating screws 36 of each dog lock 30. Rotary drive motors 60 are activated to turn actuating screws 36 and disengage dog locks 30, thus unlocking spool 10 from spool 24. Torque transducers in drive motors 60 sense when dog locks 30 are fully disengaged and deactivates drive motors 60. Slide bases 62 are actuated to move dog actuators 58 outward from axis A1 and to their original position. Pneumatic cylinder 70 is actuated to retract male key 64 out of riser portal 44. Orientation motor 54 is actuated to return rotary table 50 to its original position. Sensors confirm the position of rotary table 50 and disable motor 54. Spool 10 is then lifted from spool 24 and retrieved.

The present invention has several significant advantages. The automated riser make up device automates the alignment and connection of riser spools having ancillary lines. The device performs virtually all the tasks required for make up other than lowering the risers together. It aligns the riser spools both radially and angularly while also aligning the connector actuators with the connector. Use of the device reduces the time spent on each connection and requires fewer workers to operate than a manual connection.

While the invention is been shown in only one of its forms, it should be apparent to those skilled in the art that it is not so limited, but is susceptible to various changes without departing from the scope of the invention.

We claim:

1. A device for connecting an upper riser spool to a lower string of riser spools, the riser spools being connected to each other by a connector having a plurality of circumferentially spaced dog locks, and the spools each having an ancillary line which runs adjacent to a main line, the device comprising:

a base assembly having a opening with a central axis and a plurality of support members, the support members adapted to engage and support the string along the central axis in the opening;

a rotating member spaced above the base assembly and aligning with the central axis of the opening, the rotating member adapted to engage and rotate the upper spool about the central axis to align the ancillary line of the upper spool with the ancillary line of the string; and a plurality of connector actuators adjacent the base assembly and spaced in an array about the opening, the actuators adapted to actuate the dog connectors after the upper spool is lowered onto engagement with the string.

2. The device of claim 1 further comprising a frame extending upward adjacent the base assembly, and wherein the rotating member is mounted to the frame.

3. The device of claim 1 further comprising a guide member spaced from the base assembly and aligning with the central axis of a portal, the guide member adapted to radially align the upper spool over the string while allowing vertical movement of the upper spool.

4. The device of claim 1 wherein the rotating member has a plurality of motorized rollers mounted to rotate in a horizontal plane for engaging and rotating the upper spool.

5. The device of claim 1 wherein the rotating member has a jaw openable to accept the upper spool and closeable to engage the upper spool.

6. The device of claim 1 wherein the connector actuators are arrayed along radial lines extending from the central axis.

7. The device of claim 1 wherein the connector actuators comprise rotary actuators positioned to rotate about a radial line of the central axis.

8. The device of claim 1 further comprising a rotary table on the base actuable to rotate about the central axis, wherein the connector actuators are mounted to the rotary table to rotate about the central axis with the rotary table to align with the dog locks of the connector.

9. The device of claim 1 further comprising a plurality of linear motion members adjacent the base, wherein the connector actuators are mounted to the linear motion members for linear motion toward and away from the central axis to engage and disengage from the dog locks.

10. The device of claim 1 wherein the base assembly has a key adapted to engage notches provided on the spools for alignment of the ancillary lines.

11. The device of claim 1 wherein the base assembly is split and adapted to slide apart to facilitate placement of the spool.

12. The device of claim 1 wherein the support members comprise beams arrayed about the opening and inwardly extendable to engage and suspend the string in the opening.

13. The device of claim 1, further comprising a conduit mounted adjacent the base assembly, the conduit adapted to be connected to a source of fluid for filling the ancillary lines of the spools.

14. An apparatus for making up a riser string from riser spools, wherein an upper riser spool has a plurality of dog connectors on a lower end that engage a profile on an upper end of the riser spool when the connectors are actuated, comprising:

a plurality of support members adapted to engage and suspend the string;

a frame extending upwardly adjacent the support members;

a rotation member mounted to the frame above the support members and adapted to rotate the upper spool while suspended above the string to angularly align the upper spool with the string;

a guide member mounted to the frame above the support members and for aligning the upper spool with the string while allowing vertical movement of the upper spool; and a plurality of connector actuators positioned to actuate the dog connectors when the upper spool is lowered into engagement with the string.

15. The device of claim 14 wherein the rotation member has a plurality of horizontal rollers for engaging and rotating the upper spool.

16. The device of claim 14 wherein the rotation member has a jaw openable to accept the upper spool and closeable to engage the upper spool.

17. The device of claim 14 wherein the connector actuators are arrayed along radial lines of the string.

18. The device of claim 14, wherein each of the riser spools has at least one exterior ancillary line, and wherein the device the further comprises a conduit having a configuration in the shape of a gooseneck, with one end mounted by a swivel adjacent the frame and another end having a down spout for filling the ancillary line, the device adapted to be connected to a source of fluid.

19. A method of connecting an upper spool having an ancillary line to a string of riser spools having an ancillary line, wherein the upper riser spool has a plurality of connectors on a lower end actuable to engage a profile on an upper end of the string, comprising the steps of:

(a) providing a rotary member for engaging and rotating the upper riser spool and a plurality of connector actuators;

(b) suspending the string with a support member;

(c) lowering the upper riser spool generally over the string;

(d) engaging the rotary member with the upper spool and rotating the spool to align the ancillary line of the upper spool with the ancillary line of the string;

(e) lowering the upper spool into engagement with the string; and (f) moving the actuators radially inward and actuating the connector actuators to engage the connectors and join the upper spool to the string.

20. The method of claim 19 further comprising the steps of providing a guide member and engaging and guiding the upper spool with the guide member as the upper spool is lowered into engagement with the string.

21. The method of claim 19 wherein each of the actuators has an axis of rotation and step (f) further comprises rotating each the actuators about its axis of rotation to cause each of the connectors to secure the upper spool to the string.

22. The method of claim 19 further comprising the steps of:

after step (f), moving the actuators radially inward and lowering the upper riser and string; then, to remove the upper spool from the string, pulling the upper spool and string upward;

suspending the string with the support members;

rotating the actuators angularly around the string to align the actuators with the connectors; and releasing the connectors with the actuators and lifting the upper spool upwards.

23. The method of claim 19, further comprising:

mounting a conduit adjacent the actuators;

connecting the conduit to a source of fluid; and filling the ancillary lines of the spools with the fluid as the string is lowered.

* * * * *